Patented May 19, 1931

1,805,913

UNITED STATES PATENT OFFICE

RICHARD HERZ, OF FRANKFORT-ON-THE-MAIN, AND WERNER ZERWECK, OF FECHENHEIM, NEAR FRANKFORT-ON-THE-MAIN, GERMANY, ASSIGNORS TO GENERAL ANILINE WORKS, INC., OF NEW YORK, N. Y., A CORPORATION OF DELAWARE

NEW ALKOXY DERIVATIVES OF ANTHANTHRONE AND PROCESS OF MAKING SAME

No Drawing. Application filed October 7, 1927, Serial No. 224,756, and in Germany October 13, 1926.

In U. S. patent of Richard Herz and Fritz Schulte No. 1,728,995 of Sept. 24, 1929, alkoxyderivatives of naphthostyril are described.

We have found a process for manufacturing new alkoxyderivatives of anthanthrone by starting from these alkoxynaphthostyrilcompounds. Our process consists in saponifying the alkoxynaphthostyrils to the corresponding alkoxyderivatives of 1-aminonaphthalene-8-carboxylic acid diazotizing these derivatives, treating diazocompounds thus obtained with reducing agents and subjecting finally the alkoxyderivatives of 1.1'-dinaphthyl-8.8'-dicarboxylic acid thus obtained to the action of acid condensing agents.

The cost of the reaction may be illustrated by the following scheme of formulas:

intermediates of our combined process, are also new compounds.

The new alkoxyderivatives of anthanthrone obtained in a pure state with an excellent yield according to our invention correspond probably to the aforesaid general formula, they are when dry reddish to brownish colored powders, soluble in concentrated sulfuric acid with a reddish to greenish color. They form with an alkaline hydrosulfite solution violet colored vats and dye cotton therefrom violet tints, turning to orange to reddish shades of an excellent fastness, when exposed to the air or soaped.

In order to further illustrate our invention the following examples are given the parts being by weight and all temperatures

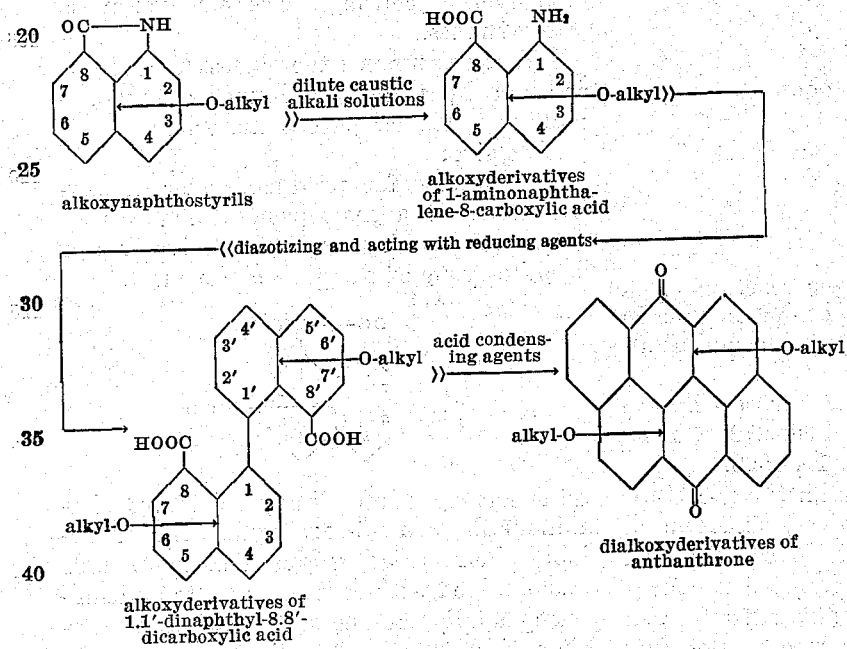

The alkoxyderivatives of 1.1'-dinaphthyl-8.8'-dicarboxylic acid, obtained as the last in centigrade degrees. We wish it however to be understood that we are not limited to the particular conditions nor to the specific products mentioned therein.

*Example*

200 parts of 5-methoxynaphthostyril of the formula:

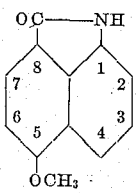

(see Example 6b of the aforesaid U. S. Patent No. 1,728,995) are by boiling for instance with a caustic soda solution of 10% saponified to the sodium salt of the 5-methoxy-1-aminonaphthalene-8-carboxylic acid of the formula:

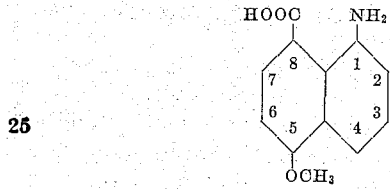

217 parts of this acid are diazotized and the diazocompound is introduced at an ordinary temperature in an ammoniacal solution of cuprous oxide, prepared from 500 parts of sulfate of copper by means of sulfur dioxide. The formed 5.5'-dimethoxy-1.1'-dinaphthyl-8.8'-dicarboxylic acid of the formula:

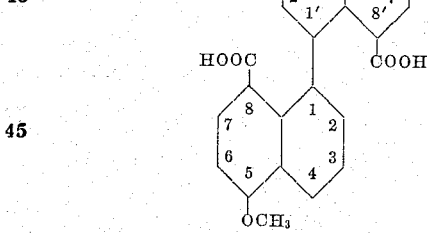

is isolated by acidifying the reaction mass. It is an almost colorless powder, soluble in dilute solutions of caustic alkalies and of alkali carbonates.

This step of our combined process is covered by U. S. Patent No. 1,684,272 of Herz and Zerweck, issued Sept. 11, 1928.

1 part of this 5.5'-dimethoxy-1.1'-dinaphthyl-8.8'-dicarboxylic acid is introduced while cooling into 25 parts of concentrated sulfuric acid of 66° Bé. The solution turns at first to orange red, then to intense green with a brilliant red fluorescence. After stirring for some hours the mass is poured on water, the dyestuff separating in red flakes is filtered, washed with water and dried. The formed dimethoxy-anthanthrone corresponding probably to the formula:

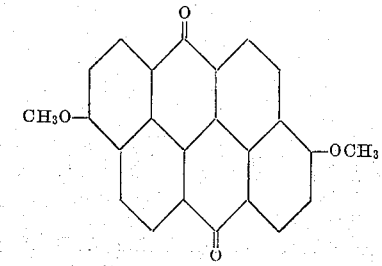

is when dry a brilliant red powder, soluble in concentrated sulfuric acid with an emerald green color and a strong red fluorescence. Recrystallized from boiling trichlorobenzene it is obtained as red needles. From a violet hydrosulfite vat cotton is dyed violet shades turning, when exposed to the air or soaped, to a brilliant reddish orange of a good fastness.

When starting from 5-ethoxynaphthostyril in the same manner the corresponding diethoxyanthanthrone is obtained, which is a dyestuff of very similar properties.

When starting from the isomeric 6-alkoxynaphthostyrils, for instance from 6-methoxynaphthostyril (cf. example 4 of the aforesaid U. S. Patent No. 1,728,995) according to our combined process an isomeric dimethoxyanthanthrone is obtained, crystallizing from trichlorobenzene as brownish little rods, soluble in concentrated sulfuric acid with a claret-red color, forming with an alkaline hydrosulfite solution a violet vat and dyeing cotton therefrom yellowish orange shades.

In the same manner the process may be carried out by using the isomeric 3-alkoxynaphthastyrils as parent materials.

We claim:

1. A process for producing new alkoxyderivatives of anthanthrone which process comprises saponifying alkoxyderivatives of naphthostyrils of the general formula:

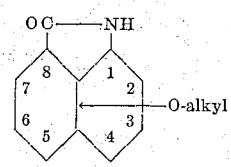

to the corresponding alkoxyderivatives of 1-aminonaphthalene-8-carboxylic acid, diazotizing them, treating the diazocompounds thus obtained with reducing agents and subjecting finally the alkoxyderivatives of 1.1'-dinaphthyl-8.8'-dicarboxylic acid thus obtained to the action of acid condensing agents.

2. As new compounds alkoxyderivatives of anthanthrone corresponding probably to the general formula:

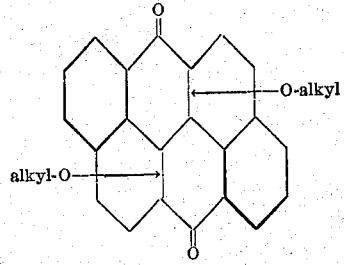

which compounds are when dry reddish colored powders, soluble in concentrated sulfuric acid with a reddish to greenish color, forming with an alkaline hydrosulfite solution violet colored vats and dyeing cotton therefrom orange to reddish shades of an excellent fastness, which compounds are substantially identical with products obtainable by saponifying alkoxyderivatives of naphthostyrils of the general formula:

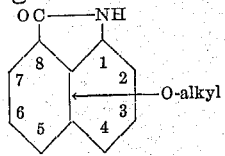

to the corresponding alkoxyderivatives of 1-aminonaphthalene-8-carboxylic acid, diazotizing them, treating the diazocompounds thus obtained with reducing agents and subjecting finally the alkoxyderivatives of 1.1′-dinaphthyl-8.8′-dicarboxylic acid thus obtained to the action of acid condensing agents.

3. A process for producing new alkoxyderivatives of anthanthrone which process comprises saponifying 5-alkoxynaphthostyrils of the formula:

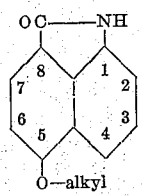

to the corresponding 5-alkoxy-1-aminonaphthalene-8-carboxylic acids, diazotizing them, treating the diazocompounds thus obtained with reducing agents and subjecting finally the 5.5′-dialkoxy-1.1′-dinaphthyl-8.8′-dicarboxylic acids thus obtained to the action of said condensing agents.

4. As new compounds alkoxyderivatives of anthanthrone, corresponding probably to the formula:

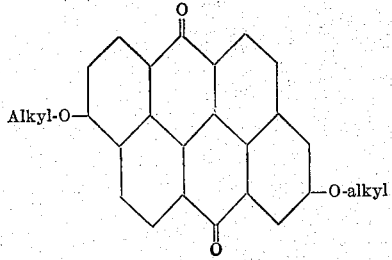

which compounds are when dry red powders, soluble in concentrated sulfuric acid with a green color and a reddish fluorescence, forming with an alkaline hydrosulfite solution a violet vat and dyeing cotton therefrom violet shades, turning to a brilliant reddish orange of a good fastness, when exposed to the air or soaped, which compounds are substantially identical with products obtainable by saponifying 5-alkoxynaphthostyrils of the formula:

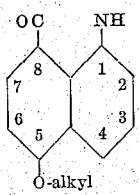

to the corresponding 5-alkoxy-1-aminonaphthalene-8-carboxylic acids, diazotizing them, treating the diazocompounds thus obtained with reducing agents and subjecting finally 5.5′-dialkoxy-1.1′-dianaphthyl-8.8′-dicarboxylic acids thus obtained to the action of acid condensing agents.

5. As new compounds, alkoxy derivatives of anthanthrone corresponding probably to the formula:

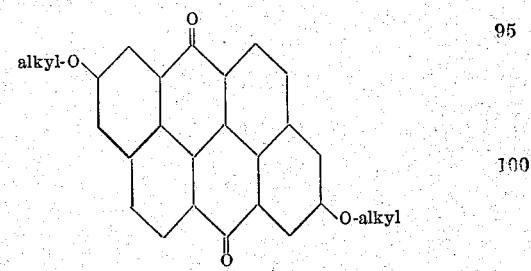

which compounds are, when dry, reddish colored powders, soluble in concentrated sulfuric acid with a reddish to greenish color, forming with an alkaline hydrosulfite solution violet colored vats, and dyeing cotton therefrom yellowish-orange to reddish shades of good fastness.

6. As a new compound, dimethoxyanthanthrone of the following formula:

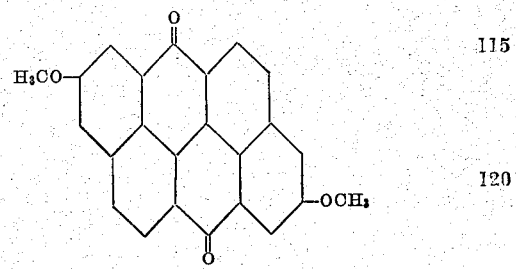

which compound crystallizes from trichlorobenzene as brownish little rods, is soluble in concentrated sulfuric acid with a claret-red color and forms with an alkaline hydrosulfite solution a violet vat from which cotton is dyed yellowish-orange shades of a good fastness.

7. As a new compound, dimethoxyanthanthrone of the following formula:

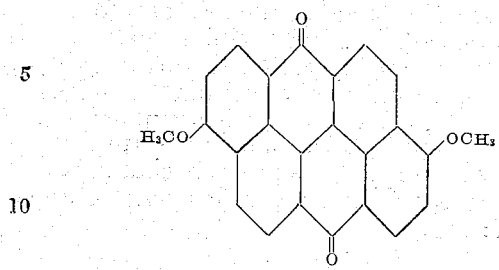

which compound is, when dry, a brilliant red powder, soluble in concentrated sulfuric acid with an emerald green color and a strong red fluorescence, forming with an alkaline hydrosulfite solution a violet vat from which cotton is dyed violet shades which turn to brilliant reddish-orange shades of good fastness when exposed to the air or soaped.

In testimony whereof, we affix our signatures.

RICHARD HERZ.
WERNER ZERWECK.

CERTIFICATE OF CORRECTION.

Patent No. 1,805,913. Granted May 19, 1931, to

RICHARD HERZ ET AL.

It is hereby certified that error appears in the printed specification of the above numbered patent requiring correction as follows: Page 3, line 53, claim 3, for the word "said" read acid; and that the said Letters Patent should be read with this correction therein that the same may conform to the record of the case in the Patent Office.

Signed and sealed this 14th day of July, A. D. 1931.

(Seal)

M. J. Moore,
Acting Commissioner of Patents.